United States Patent [19]
DiFoggio et al.

[11] Patent Number: 5,179,598
[45] Date of Patent: Jan. 12, 1993

[54] METHOD FOR IDENTIFYING AND DISPLAYING PARTICULAR FEATURES OF AN OBJECT

[75] Inventors: Rocco DiFoggio; Kathryn Burleigh, both of Houston, Tex.

[73] Assignee: Western Atlas International, Inc., Houston, Tex.

[21] Appl. No.: 531,128

[22] Filed: May 31, 1990

[51] Int. Cl.$^5$ .............................................. G06K 9/00
[52] U.S. Cl. .......................................... 382/48; 382/1; 382/17; 250/255
[58] Field of Search .................... 382/17, 48, 27, 16, 382/22, 1, 47; 324/324; 356/241; 250/253, 255

[56] References Cited

U.S. PATENT DOCUMENTS

| | | | |
|---|---|---|---|
| 4,573,197 | 2/1986 | Crimmins | 382/22 |
| 4,616,134 | 10/1986 | Pruett et al. | 250/255 |
| 4,742,233 | 5/1988 | Kuyel | 250/491.1 |
| 4,791,589 | 12/1988 | Blazo et al. | 364/518 |
| 4,876,457 | 10/1989 | Bose | 250/563 |
| 4,962,540 | 10/1990 | Tsujiuchi et al. | 382/1 |

*Primary Examiner*—Michael T. Razavi
*Assistant Examiner*—Yon Jung
*Attorney, Agent, or Firm*—E. Eugene Thigpen

[57] ABSTRACT

A method for highlighting particular features of an image photographically captured and stored in a computer is disclosed. The method essentially comprises capturing an image of an object using a video or similar electronic camera and storing the image as a series of numbers in the memory of a computer. The computer contains an image capture board and a graphics board so as to acquire and display the image on a monitor. The operator enlarges a region of the image of interest so as to display the individual pixels comprising the image. The operator, through the computer, selects individual pixels from the image to comprise a test set of pixels to be used to discriminate against all of the pixels comprising the image. Once the test set is defined, the eigenvectors and eigenvalues of the test set are calculated to define an ellipsoid encompassing substantially all of the test set data points. In essence, the ellipsoid defines an envelope in color space. The image is scanned using the test set to either accept or reject each of the pixels comprising the image. The accepted or rejected pixels are assigned a value to be used in producing a second display which highlights the desired pixels. The operator may alter the test set by adding more pixels or change the dimensions of the ellipsoid to produce a different display. Certain operations and calculations may be performed on the second image highlighting characteristics of the first image produced of object.

9 Claims, 4 Drawing Sheets

METHOD FOR IDENTIFYING AND DISPLAYING PARTICULAR FEATURES OF AN OBJECT

FIELD OF THE INVENTION

This invention relates to a method for discriminating between particular features in an otherwise substantially homogeneous substance, and has particular application to a method for determining characteristics of a core sample using digital photography.

BACKGROUND OF THE INVENTION

Objects have been photographed and digitized for analysis by computers. The image captured by a camera may be comprised of hundreds of thousands of pixel elements which are electronically captured by a computer and stored as a series of numbers in the computer's memory. Individual pixels having different intensities or colors may be selected to define a test set which is approximated by a box in color space. This box is then used to discriminate among the pixels comprising all or a portion of the image. For example, the intensities or colors used in the test set may be approximated by either a two-dimensional square or a three-dimensional cube. However, approximating the variation of colors in the test set by a box, ingnores the covariance between the colors of this test set. The adversely affects the resolution of the discrimination. If there is considerable covariance in the test set of colors, then to include all the colors of the test set may require a box so big that it also includes a multitude of undesirable points. Alternatively, to exclude the undesirable points may require a box so small that it does not include desired points of the test set of colors. The method of the present invention circumbents this problem by implicitly including the covariance of the colors in its analysis. Thus when conducting a detailed examination of certain characteristics of an object, points may be defined on the object which are either extraneous or excluded from the test set. This problem particularly arises in enhancing certain photographic images based upon some characteristic, regardless of the frequency of interest, e.g. frequency spectrum. U.S. Pat. Nos. 4,876,457 and 4,742,233, both assigned to AT&T, and U.S. Pat. No. 4,791,589 assigned to Tektronix, Inc. describe methods and apparatus for digitally photographing objects and discriminating features of the objects using brightness or similar characteristic.

It is well known that hydrocarbons fluoresce under ultraviolet light. Ultraviolet light has been used since the 1940's to determine whether a substrate contains hydrocarbons. For example, the geologist at the well site may determine if hydrocarbons are present in the formation by examining well cuttings under ultraviolet light. Similarly, core samples taken from the bore hole may also be examined under ultraviolet light to show the presence of hydrocarbons. Such a service is offered by Core Laboratories, a division of Western Atlas International, Inc. To document the findings of a laboratory examination, photographs were taken of cross-sections of cores taken under both natural and ultraviolet light. The service provided visual documentation of the rock type, and a visual representation of the extent of hydrocarbons present in the core. This provided the geologist a tool to better evaluate the reservoir.

Estimation of the amount and type of hydrocarbons using fluorescence initially was a subjective analysis. The fluorescence of a sample will vary according to the reservoir rock type and the API gravity of the hydrocarbon. A geologist's estimation will naturally vary between samples of the same rock type because the eye cannot distinguish subtle difference between brightness and/or colors of the fluorescence. The instant invention will greatly improve this technique and will perform the function consistently for every sample.

There has been a long felt yet unsolved need to provide an improved method for conducting digital photography of objects. Similarly, a long felt yet unsolved need existed for a method of consistently discriminating certain feature of objects. Such a need exists in the field of core analysis.

SUMMARY OF THE INVENTION

The instant invention provides a method for efficiently discriminating certain detectable features of an object. For example, such features may include the brightness, color, texture, grading, or structure of an object which may be exhibited by changes in color. Such characteristics of an object may be discernable by improving the manner in which one may discriminate between the elements comprising an image of the object, such as frequency of radiation or similar characteristic. Based upon this method, the operator may perform a series of statistical calculations or other operations and output the findings of such operations in a manner to assist the evaluation of the object, such as the quantitative and qualitative analyses of core taken from a well bore.

The method of this invention has application in digital photography with particular application to digital core photography. The method includes electronically capturing an image of a core sample using a camera. The image may be made with any of the detectable frequencies of radiation, particularly white light, ultraviolet light or infrared light. With respect to the analysis of core samples, it is preferred that an image be taken in both natural (white) light and ultraviolet light. The image detected by the camera is electronically transferred to an image-capture circuit operably coupled to a computer. The image may then be stored in the computer's memory as a series of numbers representing the pixels comprising the image.

A region of the image containing the feature to be examined may be enlarged such that the individual pixels are discernable. A plurality of pixels in and along the region of interest are selected and stored in the computer's memory as a test set. Based upon the sample of pixels, the computer determines the mean-centered covariance matrix, as well as the eigenvectors and eigenvalues for the pixels to define an envelope or ellipsoid of values which satisfy the pixels to be discriminated against. In essence a shrink-wrap is placed around the values comprising the test set and excludes many of those values that would have been incorrectly included under the prior art technique. Following the selection of the test set of pixels, all or part of the pixels in memory are scanned to determine whether they are accepted or rejected by the test set. Using either the accepted or rejected values, the image may be enhanced, highlighting the discriminated pixels comprising the image. Resolution or accuracy of discrimination may be changed by increasing or decreasing the number of pixels comprising the test set. Alternatively, the operator may expand or contract the size of the ellipsoid in color space while maintaining the directions of its principal axes and the ratios of the axes' lengths to one another. Histograms or similar statistical displays may be produced from the results of the improved discrimination ability of the invention.

BRIEF DESCRIPTION OF THE DRAWING FIGURES

A better understanding of the benefits and advantages of our invention may be obtained from the appended detailed description and drawing figures, wherein:

FIG. 1 generally illustrates components of a system which may be used in association with the instant invention;

DETAILED DESCRIPTION

The inventive method as described herein has application to digital photography as well as application to the analysis of earthen core samples. Adjustments or omissions may be made by those skilled in the art which are within the scope of the method.

Figure 1:
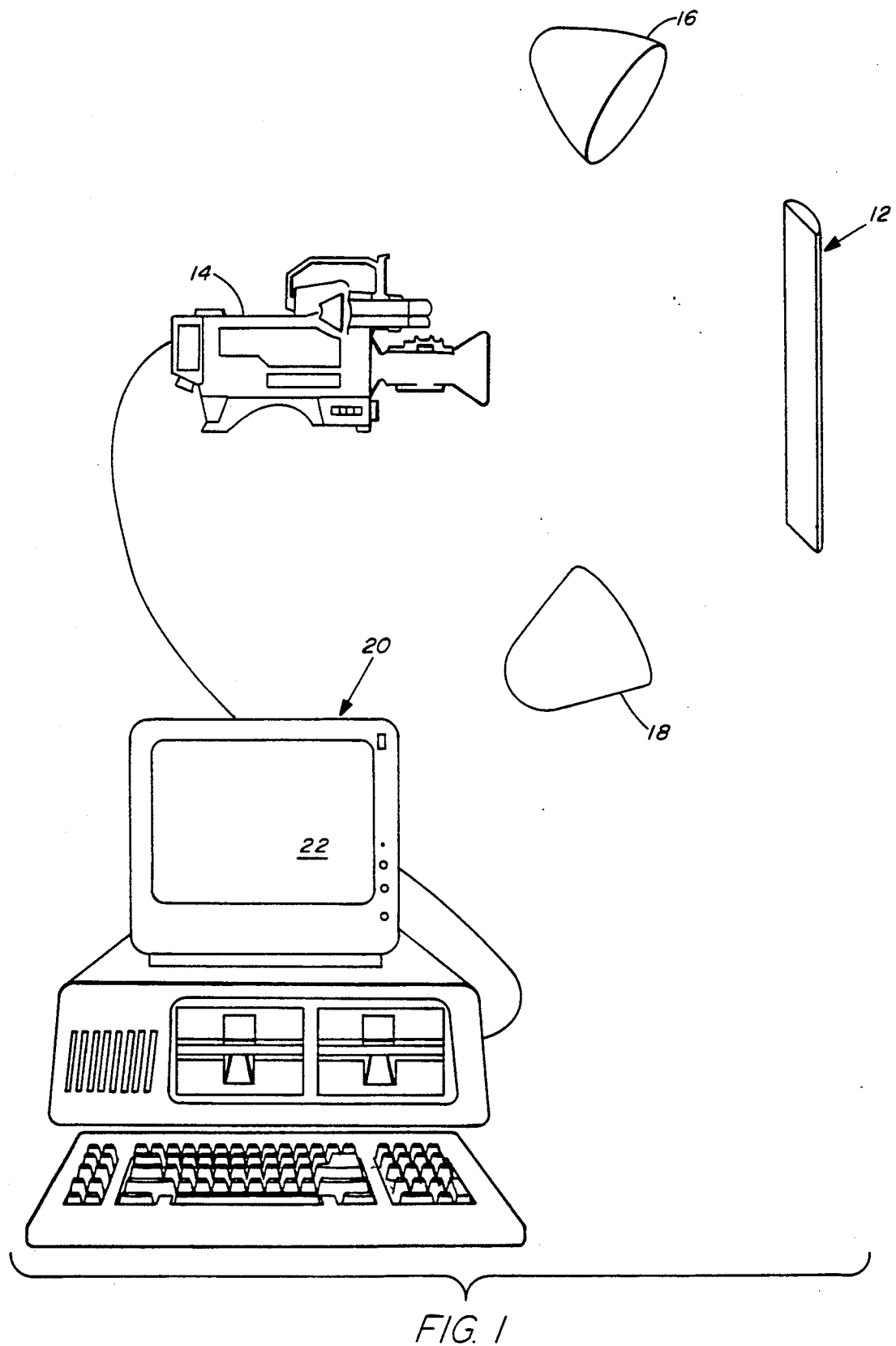

FIG. 1 generally illustrates components of a system which may be used in association with the instant invention. Generally shown in the Figure is an object 12, such as a length of core, to be photographed by a video camera 14. The object to be photographed need not be three-dimensional, but may include two-dimensional images such as diagrams or other photographs. Alternatively, instead of photography, the image may be made by scanning an already existing image such as a photograph or image printed by a plotter using devices currently available on the market.

A variety of light sources may be used to highlight the object to be photographed. For example, a white light 16 and a ultraviolet light 18 are shown. The image received by the camera 14 is transmitted to a computer 20 having an image-capture circuit (not shown). The image-capture circuit redefines the image as hundreds of thousands of pixels which are stored in memory as a series of triplets of numbers, with each triplet of numbers (a red, green and blue intensity) representing a pixel's color. Each pixel's color is actually represented as a 16-bit binary code. Each color is represented by a five-bit portion of the code. The remaining bit controls the overlay position of the colors. The pixel's position in the image by where in memory its triplet of color values is stored.

Although not shown in FIG. 1, the computer preferably contains a high-resolution graphics adapter well known in the computer industry. The graphics card enables the computer to display the images on a monitor 22 and to perform operations on the stored image as will be described below.

Figure 2:
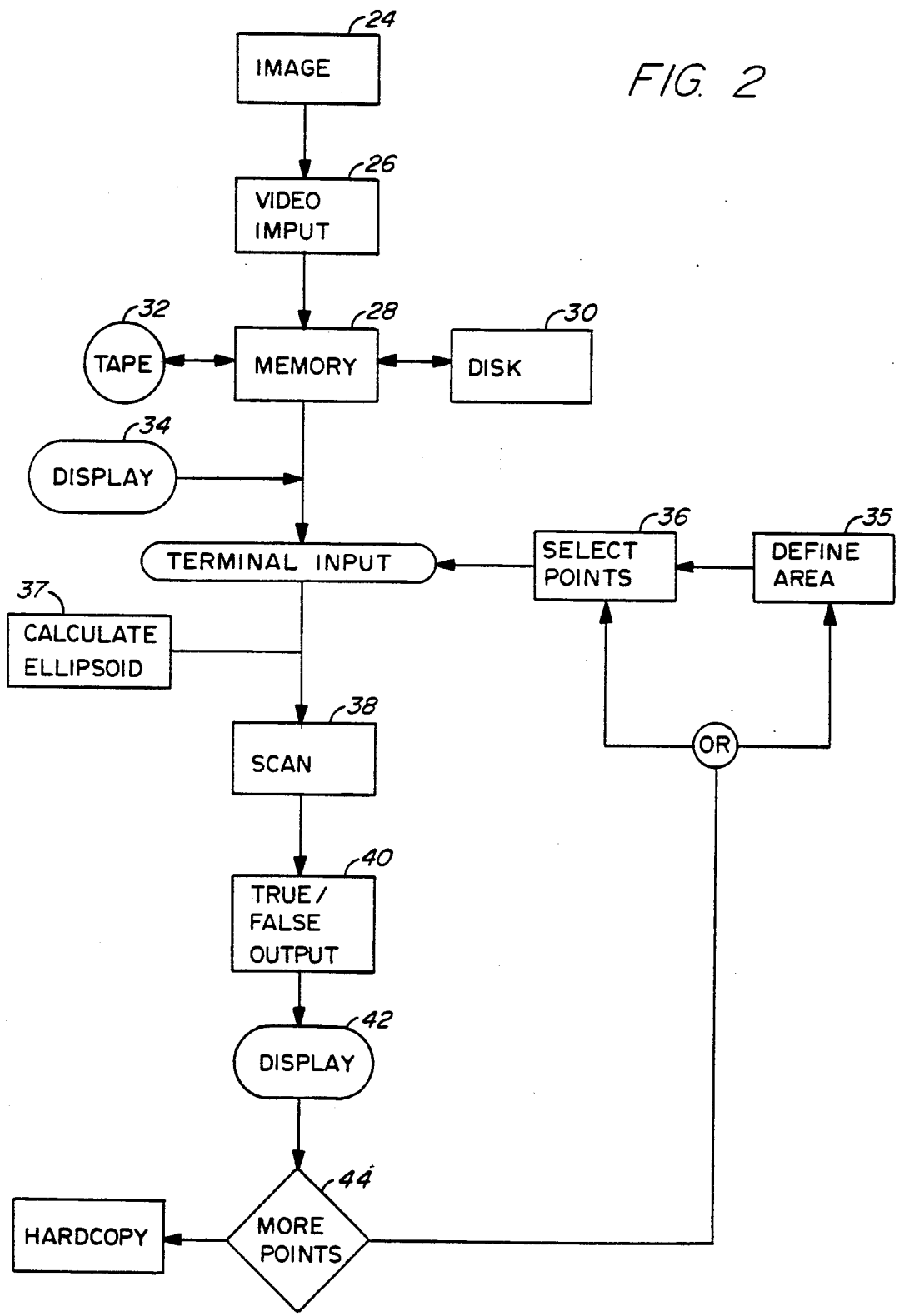
FIG. 2 is a flow chart of the steps comprising the invention.

FIG. 2 is a flow chart depicting the steps of the inventive method. The initial step involves obtaining an image 24 of the object. As indicated above, the image may be obtained by the video camera 14 or other camera which produces an analog or digital output. The image obtained by the camera 14 produces an output which serves as an input 26 to the image-capture circuit coupled to the computer 20. The computer and the associated image-capture circuit are controlled by commercially available software packages such that the operator may capture the image at a given instant in time. The captured image may then be stored in a memory 28 as a series of numbers. The memory 28 may be a magnetic disk 30 or tape 32, or may reside in a random-access-memory (RAM).

Figure 3:
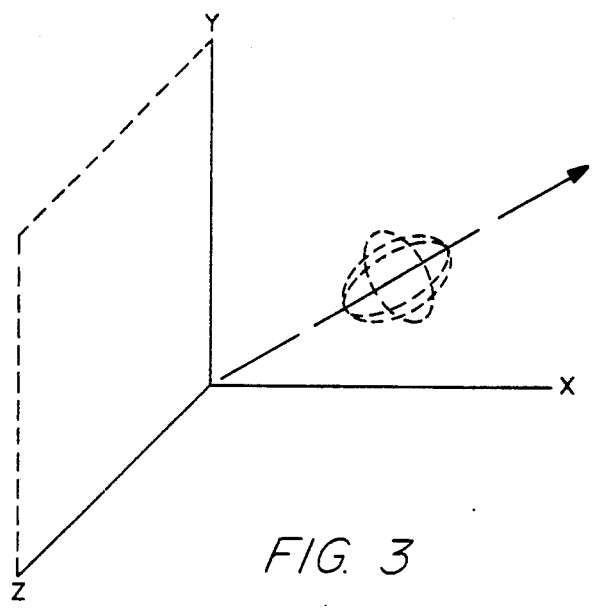
FIG. 3 is a general representation of a subset of points located in three-dimensional color space.

The resolution of the image stored in the computer's memory is dependent upon the quality of the camera system and the image capture board. For example, an RCA home video camera coupled to a TARGA brand image-capture board in an IBM PC-XT computer produces an image having greater than two-hundred thousand pixels. Each pixel may be capable of displaying one of more than thirty-two thousand possible colors. The color for each pixel is determined by three numbers; one for red, one for blue and one for green, with each value ranging between zero and thirty-one. FIG. 3 graphically illustrates the range of colors each pixel can display. The three axes, X, Y and Z, shown in FIG. 3 define a cubical volume or "color space" which will be referred to below.

Returning to FIG. 2, once the image has been stored in the computer's memory 28, the operator may at step 34 recall all or a portion of the image and display it on the monitor 22. This accomplished with the aid of a graphics-adaptor board coupled with the computer. The operator may select the image taken under natural light, the image taken under the ultraviolet light, or may recall both of them simultaneously on the screen. In either of the images, the operator may select a region 35 to be analyzed by defining the boundaries of the region through the computer keyboard. The scale of the area defined by the operator may also be adjusted through the computer keyboard. It is preferred that an area of interest in the image be enlarged so as to display the individual pixels comprising that portion of the image. From the enlarged image, the operator selects a plurality of pixels ("test set") along or in the region of interest. The selection of pixels from the image for the test set may be represented in the flow chart at 36 and may be selected using a mouse or through the keyboard terminal.

The number of points necessary to adequately define a feature may vary for a given application. However, it is preferred that at least ten pixels be selected for each test set. The test set defines a region in color space which the computer will use for discriminating other pixels in all or a selected portion of the image.

Once the test set of points has been selected, and before scanning the desired portion of the image, a calculation must be performed at step 37 to further delineate the range of colors to be accepted or rejected in the scanning of the image. The area used for accepting or rejecting pixels is defined by determining the mean-centered covariance matrix for the test set as illustrated by Equation 1 as follows:

$$C = \begin{pmatrix} \Sigma(\Delta R_i)^2 & \Sigma \Delta R_i \Delta G_i & \Sigma \Delta R_i \Delta B_i \\ \Sigma \Delta G_i \Delta R_i & \Sigma(\Delta G_i)^2 & \Sigma \Delta G_i \Delta B_i \\ \Sigma \Delta B_i \Delta R_i & \Sigma \Delta B_i \Delta G_i & \Sigma(\Delta B_i)^2 \end{pmatrix} \quad (1)$$

where $\Delta R_i$ is equal to $R_i$ minus the mean of R; $\Delta G_i$ is equal to $G_i$ minus the mean of G; and $\Delta B_i$ is equal to $B_i$ minus the mean of G. The delta values for each of the colors are determined by the differences between a color and the center or mean for the color. Using the mean-centered covariance matrix, the next step is to solve the eigenvalue equation as expressed in Equation 2:

$$C - \lambda I = 0 \qquad (2)$$

where $\lambda$ is equal to $\lambda_1$, $\lambda_2$ and $\lambda_3$ and the axial lengths, $A_i$, are related to $\sqrt{\lambda_i}$. In the case of a uniform distribution, the axial lengths, $A_i$, are equal to $\sqrt{5\lambda_i}$. Equations 1 and 2 define eigenvalues and eigenvectors for an ellipsoid encompassing the test set of points in the color space seen in FIG. 3.

In general terms, a conceptual envelope or volume in color space is defined by the test-set points and includes those points in between the set of test points as well as the test points themselves. An eigenvector is a non-zero vector $\nu$ whose direction is not changed by a given linear transformation T; that is, $T(\nu)$ is equal to $\lambda \nu$ for some scaler $\lambda$. Such vectors are also known as characteristic vectors. Eigenvectors are the principle directions of the ellipsoid. An eigenvalue is one scaler $\lambda$ such that $T(\nu)$ is equal to $\lambda \nu$, where T is a linear operator on a vector space, and $\nu$ is an eigenvector. These are also known as characteristic numbers; characteristic roots; characteristic values; latent roots; and proper values. A proof for the eigenvector equations is provided in the Appendix.

Following the selection of the test set by the operator, step 36, the computer scans the image at step 38 and determines whether each pixel satisfies the test set. That is whether or not each pixel is within the ellipsoid of color space. As the computer scans the image, 38, each pixel is either accepted or rejected by the test set of points comprising the ellipsoid and either a true or a false value is assigned to each pixel. The true and false values for the pixels are stored in memory for later use.

Figure 4:
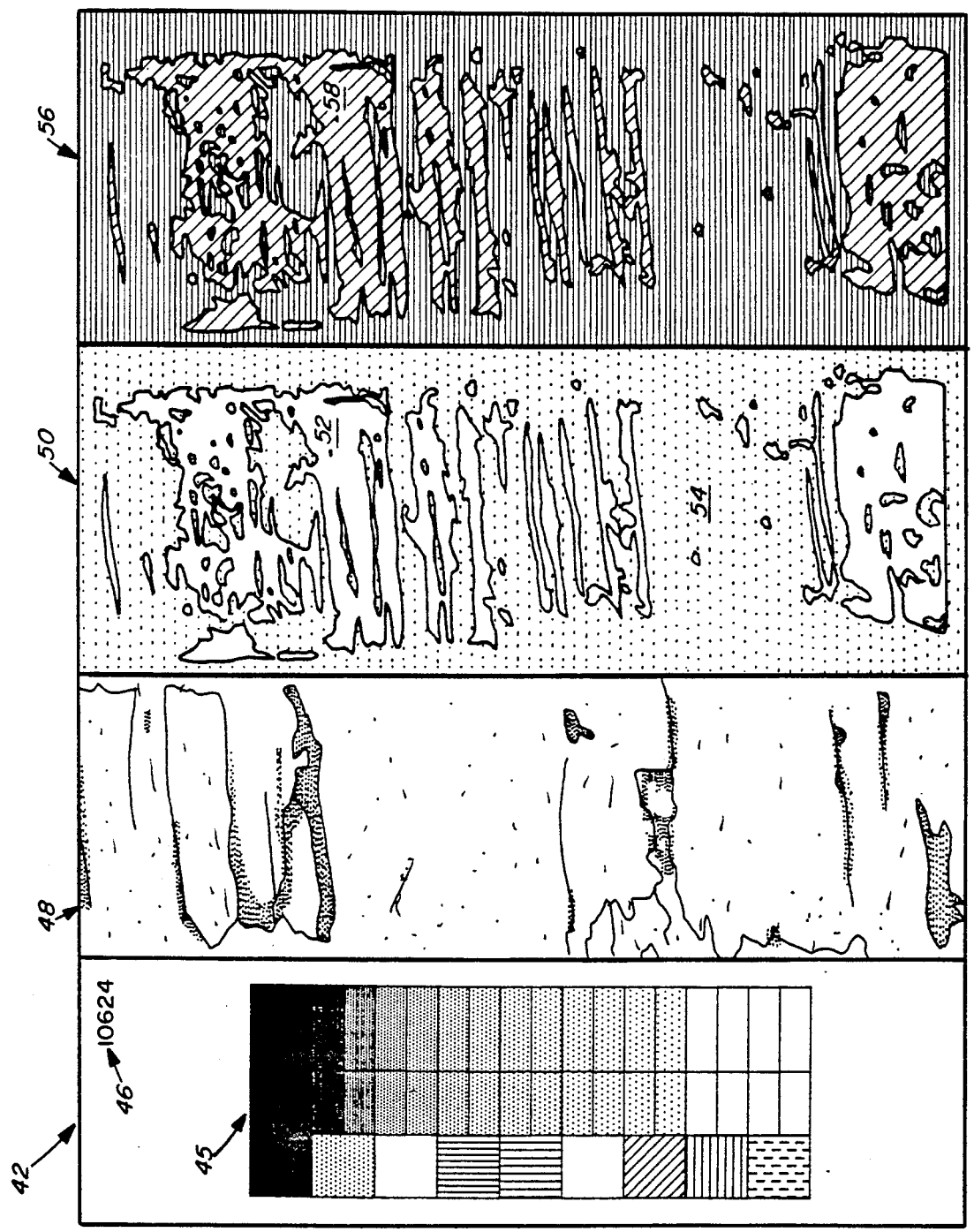
FIG. 4 is a typical example of a display contemplated by this invention.

Following the scan the true or false values assigned to each pixel are output at step 40 and displayed at step 42. The output may consist of a falsely colored image, providing an overall picture of the true and false values. FIG. 4 is a typical example of a core sample image contemplated by this invention. Four images are shown. Moving from left to right, the first column shows a color bar chart 45 which illustrates the range of possible colors and grey scales. Also indicated in this column is the depth 46 of the bore hole where the core sample was taken. Adjacent the color bar scale is the natural image of a core sample 48. The natural image in this instance is of a core sample sliced longitudinally to expose an uncontaminated surface. The third column 50 is an image of the same portion of core as in the second column, but under ultraviolet light. Notice the highlighted regions 52, indicating the presence of hydrocarbons, while the blackened zones such as 54 are hydrocarbon free. The far right image 56 is a falsely colored image of the ultraviolet image 50. Pixels were selected for the test set. The eigenvectors and eigenvalues were calculated by the computer to a best-fitting ellipsoid and the image 50 was scanned. From the comparison of all of the pixels with the test set, the computer falsely colored those portions which satisfy the test set. As shown by the Figure, region 58 closely approximates the highlighted portions of image 50. However, if the operator is dissatisfied with the display, the operator may return to redefine the area of interest, or select more test set points; step 44 as shown in FIG. 2.

One of the most significant aspects of this method for discriminating characteristics of an image is the data display. Once the falsely colored image is obtained, the data may be displayed in a manner readily interpreted by the explorationist. Moreover, the operator may want to perform several statistical operations on the data as well.

Figure 5:
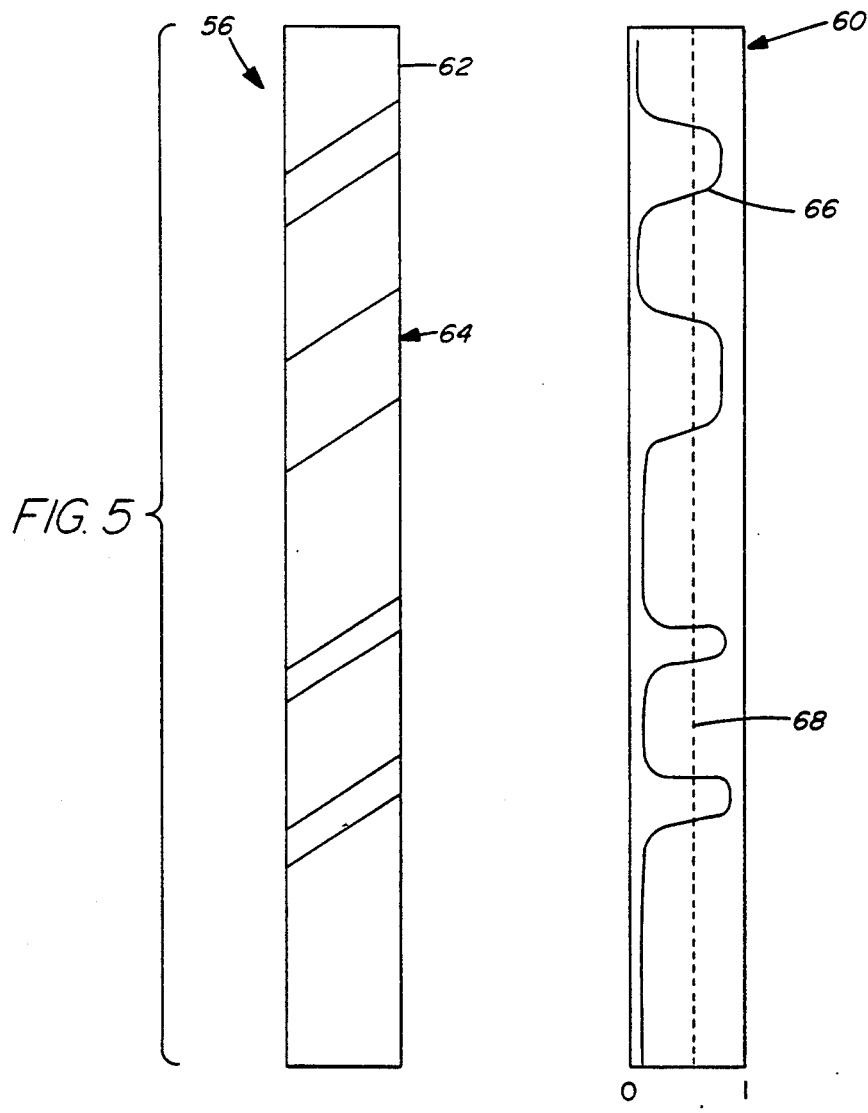
FIG. 5 is an example of a display presenting the data obtained from an image.

FIG. 5 is an example of one display presenting the data obtained from a falsely colored image of a core sample. The Figure presents the fluorescing and non-fluorescing zones in the false colored image 62 in a log-type display 60 similar to a conventional wireline log used in petroleum exploration. The thickness of an interval 64 is determined by first independently selecting the apparent dip of the structures in the core sample. This is accomplished by defining a line in the image which parallels any laminae or bedding planes in the sample. The apparent dip is stored in the computer's memory for later reference. The computer also defines an imaginary center line which extends the length of the core sample. The computer then scans across the image from side to side along a series of scan lines tilted at the apparent dip angle. The computer determines the continuity of either the true or the false pixels for each scan line. The number of true or false values for each scan line are normalized by dividing by the total number of pixels scanned. Each normalized value is stored in the computer's memory and is associated with the depth (distance down the center line of the core) where its corresponding scan line intersected the center line.

Once the computer has scanned the preferred length of core and normalized the values, the computer displays the continuity of the image in a "continuity log" 60. The output from the scan produces a curved line 66 which represents the number of either true or false values out of the total number of pixels scanned across the image at the apparent dip angle. The operator may pick a threshold 68 ranging between 0 and 1 to indicate which portions of the core sample contain significant shows of hydrocarbons. Based upon the location of the threshold line, the thickness and number of hydrocarbon shows may be calculated. Such data may be used to determine perforation locations, pay zone thickness, total pay, apsects of geologic history, etc. Data from the "continuity log" may be used for statistical analysis of the core sample. For example, a histogram of the hydrocarbon shows may be calculated from the continuity log.

Our invention has been described with a certain degree of specificity. Variations will occur to those skilled in the art which are within the scope and spirit of this invention which is limited only by the appended claims.

Appendix

The following are the mathematical algorithms used in image analysis. The purpose is to determine if an arbitrary color is similar to a representative set of colors of some feature (such as sand, shale, fluorescence, etc.) in the image. Consider a representative set of N colors which form a cloud of points in red-green-blue color space.

Written out in terms of their red, green, and blue components, they are:

1st color = $(R_1, G_1, B_1)$
2nd color = $(R_2, G_2, B_2)$
Nth color = $(R_N, G_N, B_N)$ The mean or average values of the red, green, and blue color components of this set of points are given by, $$R = \frac{1}{N} \sum_{i=1}^{N} R_i \quad G = \frac{1}{N} \sum_{i=1}^{N} G_i \quad B = \frac{1}{N} \sum_{i=1}^{N} B_i$$

The mean-centered covariance matrix is given by, $$C = \begin{bmatrix} C_{11} & C_{12} & C_{13} \\ C_{21} & C_{22} & C_{23} \\ C_{31} & C_{32} & C_{33} \end{bmatrix} = \begin{bmatrix} \sum_{i=1}^{N}(R_i-R)^2 & \sum_{i=1}^{N}(R_i-R)(G_i-G) & \sum_{i=1}^{N}(R_i-R)(B_i-B) \\ \sum_{i=1}^{N}(G_i-G)(R_i-R) & \sum_{i=1}^{N}(G_i-G)^2 & \sum_{i=1}^{N}(G_i-G)(B_i-B) \\ \sum_{i=1}^{N}(B_i-B)(R_i-R) & \sum_{i=1}^{N}(B_i-B)(G_i-G) & \sum_{i=1}^{N}(B_i-B)^2 \end{bmatrix}$$

Notice that matrix is symmetric. That is $C_{ij}=C_{ji}$ for all $i,j$.

The eigenvalues of C are those $\lambda$ such that the determinant of C minus $\lambda$ times the unit matrix I is zero. That is:

$$|C - \lambda I| = 0 \text{ where } I = \begin{pmatrix} 1 & 0 & 0 \\ 0 & 1 & 0 \\ 0 & 0 & 1 \end{pmatrix}$$

Written explicitly, $$\begin{vmatrix} C_{11}-\lambda & C_{12} & C_{13} \\ C_{21} & C_{22}-\lambda & C_{23} \\ C_{31} & C_{32} & C_{33}-\lambda \end{vmatrix} = 0$$

Expanding the determinant and collecting terms, we get the (cubic) characteristic equation, $$\lambda^3 - (C_{11}+C_{22}+C_{33})\lambda^2 + [(C_{11}C_{22}+C_{11}C_{33}+C_{22}C_{33}) - (C_{12}C_{21}+C_{13}C_{31}+C_{32}C_{23})]\lambda - C_{11}(C_{22}C_{33}-C_{32}C_{23})$$

$$+ C_{12}(C_{21}C_{33}-C_{31}C_{23}) - C_{13}(C_{21}C_{32}-C_{31}C_{22}) = 0$$

Substituting the names $a_1, a_2, a_3$ for the coefficients of $\lambda^2, \lambda^1$ and $\lambda^0$, $$\lambda^3 + a_1\lambda^2 + a_2\lambda + a_3 = 0$$

Let $Q = (a_1^2 - 3a_2)/9$,
$R = (2a_1^3 - 9a_1a_2 + 27a_3)/54$, $$\theta = \operatorname{acos}\left(\frac{R}{\sqrt{Q^3}}\right)$$

Since the covariance matrix is symmetric and real, it must have 3 real roots.

They are $$\lambda_1 = -\frac{a_1}{3} - 2\sqrt{Q}\cos\left(\frac{\theta}{3}\right)$$

$$\lambda_2 = -\frac{a_1}{3} - 2\sqrt{Q}\cos\left(\frac{\theta+2\pi}{3}\right)$$

$$\lambda_3 = -\frac{a_1}{3} - 2\sqrt{Q}\cos\left(\frac{\theta+4\pi}{3}\right)$$

These are the eigenvalues.

Let U be the matrix of eigenvectors, with the first column of U being the eigenvector associated with the first eigenvalue, the second column of U being the eigenvector associated with the second eigenvalue, and similarly for the third column of U. Let the k-th column of U be written as $U^k$ for clarity.

$$U = \begin{pmatrix} U_{11} & U_{12} & U_{13} \\ U_{21} & U_{22} & U_{23} \\ U_{31} & U_{32} & U_{33} \end{pmatrix} = (U^1 U^2 U^3)$$

where $U^1$, $U^2$, $U^3$ are the eigenvectors.

By definition, the k-th eigenvector (the one associated with the k-th eigenvalue $\lambda_k$), is the solution to the equation. $CU^k = \lambda_k U^k$, or $CU^k - \lambda_k U^k = 0$, or $(C - \lambda_k I)U^k + 0$, or $$\left.\begin{array}{l} \left(\left(\sum_{j=1}^{3} C_{1j} U_{jk}\right) - \lambda_k U_{1k} = 0\right) \\ \left(\left(\sum_{j=1}^{3} C_{2j} U_{jk}\right) - \lambda_k U_{2k} = 0\right) \\ \left(\left(\sum_{j=1}^{3} C_{3j} U_{jk}\right) - \lambda_k U_{3k} = 0\right) \end{array}\right\}$$

For *each* eigenvalue $\lambda_k$ where $k=1, 2$ or $3$ we obtain these three *homogeneous* equations in three unknowns. We can only solve for $U_{jk}$ within a multiplicative factor until we add an additional constraint equation, requiring that $$\sum_{j=1}^{3} U_{jk}^2 = 1$$

for $k=1, 2, 3$ or that the eigenvectors have *unit* length.

Thus, solving the above four equations simultaneously, we obtain the components $U_{jk}$ of the eigenvector matrix U, (that is, all three eigenvectors).

The eigenvectors and eigenvalues can be used to define an ellipsoid in color space.

The eigenvectors define the directions of the principal axes of this ellipsoid and the eigenvalues define the lengths of these axes.

For a cloud of *uniformly* spaced points inside an ellipsoid, the semi-axes' lengths are $\sqrt{5}$ times the square roots of the corresponding eigenvalues. Since our representative color set might not be uniformly spaced, we use an adjustable scale factor S which we typically set between $\sqrt{3}$ and $\sqrt{6}$.

We can test if an arbitrary color $P_A = (R_A, G_A, B_A)$ is similar enough to our representative N colors by determining if it is inside the ellipsoid defined by our eigenvalues, eigenvectors, and scale factor.

The eigenspace coordinates of this arbitrary color $P_A$ are $(E_1, E_2, E_3)$, given by, $$E_1 = (R_A-R)U_{11} + (G_A-G)U_{21} + (B_A-B)U_{31}$$

$$E_2 = (R_A-R)U_{21} + (G_A-G)U_{22} + (B_A-B)U_{23}$$

$$E_3 = (R_A-R)U_{31} + (G_A-G)U_{32} + (B_A-B)U_{33}$$

The test expression is $$T = \frac{1}{S^2} \left( \frac{E_1^2}{\lambda_1} + \frac{E_2^2}{\lambda_2} + \frac{E_3^2}{\lambda_3} \right)$$

If $T \leq 1$, the color point $P_A$ is either inside the ellipsoid or on its surface and *is* similar to our representative colors.

If $T > 1$, the color point $P_A$ is outside the ellipsoid and is *not* similar to our representative colors.

We claim as our invention:

1. A method for displaying characteristics of a core sample, comprising the steps of:
   (a) generating a first image of the core sample with an image collecting instrument and storing the first image as a plurality of pixels in a memory means;
   (b) identifying a test set of pixels from the plurality of pixels in said memory means, the test set of pixels being representative of a selected characteristic of the core sample;
   (c) deriving, from the test set of pixels, an envelope of values having substantially the same variance and covariance as the test set of pixels, wherein deriving the envelope, further comprises:
   (i) computing a mean-centered covariance matrix of the test set of pixels; and
   (ii) computing, from the mean-centered covariance matrix, eigenvectors and eigenvalues of an ellipsoid representing the envelope of values which encloses the test set of pixels;
   (d) determining whether selected pixels in the first image are within the envelope of values; and
   (e) displaying a second image of the core sample using a displaying means, wherein the selected pixels determined to be within the envelope are visually distinguishable from the selected pixels determined to be outside the envelope.

2. The method as defined in claim 1, further comprising the step of proportionally adjusting the dimensions of the eigenvectors.

3. A method for displaying characteristics of an object, comprising the steps of:
   (a) generating a first image of the object with an image collection instrument and electronically storing the first image in a computer, the first image comprised of a plurality of pixels;
   (b) defining a region of interest in the first image;
   (c) enlarging the defined region to display the pixels within the defined region;
   (d) selecting a subset of pixels from the pixels in the defined region, the subset of pixels being representative of a selected characteristic of the object, wherein the selected characteristic is visually distinguishable by its range of colors;
   (e) calculating the mean-centered covariance matrix for the subset of pixels;
   (f) calculating eigenvalues and eigenvectors from the covariance matrix, wherein the eigenvalues and eigenvectors define an ellipsoid in three-dimensional color space that contains the subset of pixels representative of the selected characteristic;
   (g) determining whether selected pixels in the first image are within the ellipsoid; and
   (h) displaying using a displaying means a second image of the object, wherein the selected pixels determined to be within the ellipsoid are visually distinguishable from the selected pixels determined to be outside the ellipsoid.

4. The method as defined in claim 3, further comprising the step of selecting additional pixels for the subset of pixels and repeating steps (e) through (h).

5. The method as defined in claim 3, further comprising the step of proportionally enlarging or reducing the ellipsoid and repeating steps (e) through (h).

6. A method for highlighting particular features of an object, comprising the steps of:
   (a) generating a first image of the object as a plurality of pixels with an image collection instrument;
   (b) storing the pixels as a plurality of numbers in a computer;
   (c) defining a subset of pixels from the plurality of pixels which contains a particular feature of interest and further comprising:
   (i) computing a mean-centered covariance matrix from the subset of pixels;
   (ii) calculating eigenvectors and eigenvalues from the mean-centered covariance matrix; and
   (iii) defining, from the eigenvectors and eigenvalues, an ellipsoid in three-dimensional color space which encloses the subset of pixels;
   (d) scanning selected pixels in the first image and accepting pixels which are inside the ellipsoid; and
   (e) displaying using a displaying means a second image of the object to distinguish the accepted pixels.

7. The method as defined in claim 6, further comprising the step of adjusting a scale of the first image.

8. The method as defined in claim 6, further comprising the step of:
   (a) calculating a continuity of pixels in the second image;
   (b) displaying the continuity of pixels as a function of a dimension of the object.

9. The method as defined in claim 8, wherein the calculating step
   (a) comprises the steps of:
   (i) visually determining an apparent dip angle in the first image; and
   (ii) scanning the second image along a series of scan lines tilted at the apparent dip angle to determine percentage values representing percentages of the selected feature along the scan lines;

and the displaying step (b) comprises the steps of:
 (i) associating each percentage value with a vertical height in the second image, the height being the intersection of a vertical center line of the image with the scan line used to determine the percentage value;
 (ii) creating a continuity log from the percentage values and the associated vertical heights; and
 (iii) displaying the continuity log.

* * * * *